Patented Oct. 27, 1925.

1,559,176

UNITED STATES PATENT OFFICE.

ILLIAM B. NEWKIRK, OF RIVERSIDE, ILLINOIS, ASSIGNOR TO INTERNATIONAL PATENTS DEVELOPMENT COMPANY, OF WILMINGTON, DELAWARE, A CORPORATION OF DELAWARE.

DEXTROSE HYDRATE.

No Drawing.   Application filed August 16, 1924.   Serial No. 732,558.

*To all whom it may concern:*

Be it known that I, WILLIAM B. NEWKIRK, a citizen of the United States, residing at Riverside, in the county of Cook and State of Illinois, have invented certain new and useful Improvements in Dextrose Hydrates, of which the following is a specification.

My invention relates to dextrose hydrate, particularly a product in the form of separate hydrate crystals, for example, a product of the character produced in accordance with the method disclosed in my Patent No. 1,417,347, October 23, 1923; and the object of the invention is the production of a dextrose hydrate which will be unaffected, or less affected than the normal product, by contact with moisture, atmospheric moisture especially.

If ordinary crystalline dextrose, hydrate or anhydrous, is exposed to a moist atmosphere, the particles are likely to become sticky, to a certain extent depending on the degree of humidity of the atmosphere, and to adhere to each other in lumps.

In the manufacture of the hydrate products, I prevent this sticking and lumping, under the extreme humidity conditions mentioned, by subjecting the material (after separation of the mother liquor from the crystals by centrifuging and washing) to a drying operation which besides evaporating the water adherent to the crystals, also removes some of the molecular water or water of crystallization. Normal dextrose hydrate contains ten per cent of water of crystallization (one molecule). A portion of this water may be removed by a dehydrating operation such as is disclosed, for example, in the copending application of Joseph J. Merrill filed April 18, 1924, Serial No. 707,397 in which the material is passed through revolving drums in contact with currents of heated air. Other methods of dehydration may be used. If a product thus deficient in molecular water is brought into contact with moisture, for example by exposure to moist atmosphere, the water passing into the product is taken up as water of crystallization to the extent of the deficiency of the crystals in respect to their normal water of crystallization. Consequently the product can be exposed for some time to quite moist air without the particles becoming wet and sticky.

I have found that it is practical to reduce the molecular water content to as low as six per cent or even lower. The amount of dehydration can be made dependent upon the atmospheric condition to which the product is to be subjected. If it is to be shipped abroad by sea, the dehydration should be carried to a greater extent than may be necessary under other conditions.

The fact that dextrose hydrate can be dried so as to lose some of its molecular water and when in this condition will receive moisture into the crystal as water of crystallization to the extent of the deficiency in this respect, with the consequent possibility of so protecting the product against the otherwise detrimental effect of exposure to moist atmosphere, constitutes one of the advantages of the hydrate product over the anhydrous product.

I claim:

1. Dextrose hydrate containing some of but less than the normal quantity of water of crystallization.

2. Dextrose hydrate in the form of separate crystals containing some of but less than the normal quantity of water of crystallization.

3. Dextrose containing hydrate crystals having some of but less than the normal quantity of water of crystallization.

4. Dextrose consisting of separate crystals of normal hydrate form containing some of but less than the normal quantity of water of crystallization.

5. Dextrose hydrate consisting of hydrate crystals containing substantially less than ten percent of water of crystallization, but not less, approximately, than six percent thereof.

6. Crystalline dextrose consisting of separate hydrate crystals substantially unimpaired as to their crystalline structure, but containing less than the normal quantity of water of crystallization.

WILLIAM B. NEWKIRK.

Certificate of Correction.

It is hereby certified that in Letters Patent No. 1,559,176, granted October 27, 1925, upon the application of William B. Newkirk, of Riverside, Illinois, for an improvement in "Dextrose Hydrates," an error appears in the printed specification requiring correction as follows: Page 1, line 14, for number "1,417,347" read *1,471,347*; and that the said Letters Patent should be read with this correction therein that the same may conform to the record of the case in the Patent Office.

Signed and sealed this 17th day of November, A. D. 1925.

[SEAL.]

WM. A. KINNAN,
*Acting Commissioner of Patents.*